April 24, 1956  K. MAYBACH  2,743,143
SCREW CONNECTION FOR MULTIPARTITE PISTONS
OF INTERNAL COMBUSTION ENGINES
Filed March 30, 1953
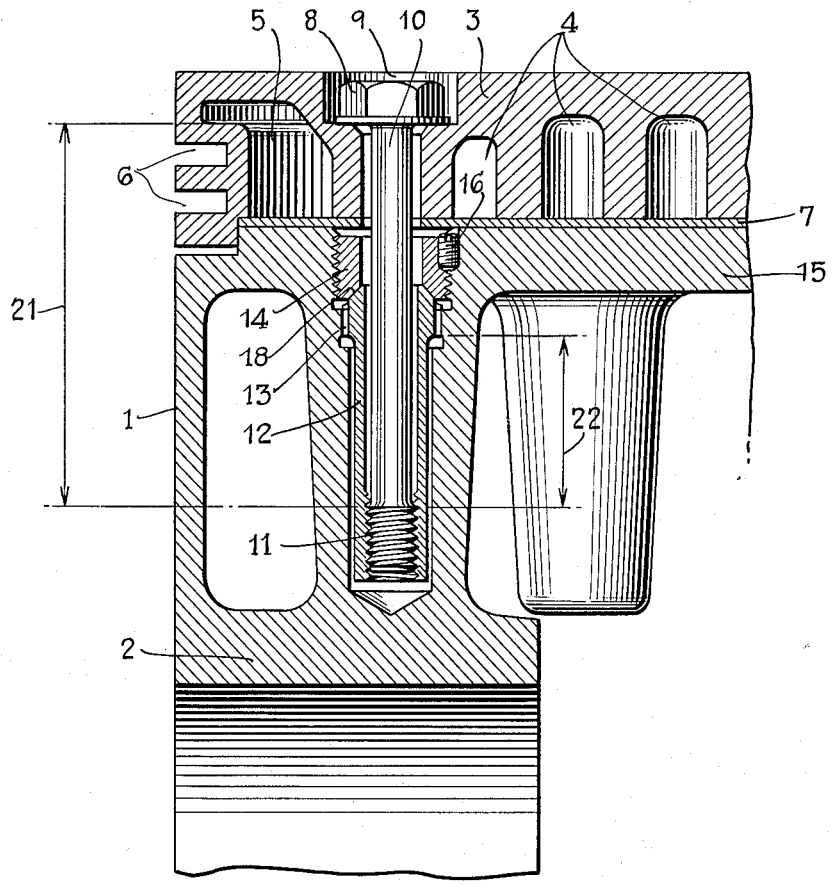
INVENTOR:
KARL MAYBACH.
BY K. A. Mayr.
Attorney.

United States Patent Office 2,743,143
Patented Apr. 24, 1956

2,743,143

SCREW CONNECTION FOR MULTIPARTITE PISTONS OF INTERNAL COMBUSTION ENGINES

Karl Maybach, Friedrichshafen am Boden See, Germany, assignor to Maybach-Motorenbau G. m. b. H., Friedrichshafen, Germany, a German firm Application March 30, 1953, Serial No. 345,592

8 Claims. (Cl. 309—15)

This invention relates to a connection of the head part to the skirt part of a multipartite piston for internal combustion engines, by means of a plurality of threaded bolts. Pistons of this type are particularly used if the piston head is cooled by oil under pressure and particularly in motors for vehicles of all kinds and for ship and aircraft propulsion.

Difficulties have been experienced with pistons of the aforedescribed kind because the relatively short bolts cannot be sufficiently pretensioned and because the transmission of the forces from the piston pin to the pin bearings and to the piston skirt affect also the screw bolts, producing bending stresses which cause breaking of the bolts.

According to the invention, sleeves extend into the skirt part of the piston and are held therein at the end of the sleeve which is proximal to the piston head. The sleeves are otherwise freely movable in the skirt part of the piston and are provided with an internal thread at the end distal of the piston head for receiving the threaded end of the bolts.

The length of the sleeve is considerably greater than that of its internal thread. The cross section of the sleeve which is compressed when the bolt is tightened, is preferably substantially as great as the cross section of the bolt. With the construction according to the invention, the combined lengths of the sleeve and bolt which can be tensioned is ten and more times greater than in conventional designs.

The disadvantages of conventional arrangements are overcome with the connection according to the invention, because of the increased length of the tensionable portion of the bolt. The connection of the bolt with the skirt part of the piston is far above the piston pin bearing and is preferably in the flange at the upper end of the piston skirt. All dynamic bending stresses of the bolt are reduced due to its great tensionable length. Since the connection of the bolt with the skirt part is far above the piston pin no stresses caused by the latter are transmitted to the bolt. The latter is very little or not at all dynamically stressed. The elastic yieldability of the bolt affords an extremely favorable self adjustment of the bolt shaft and its thread. The different movements of the ends of the bolt occurring during normal operation transversely to the longitudinal piston axis cause no undesired additional stresses in the bolts as is the case in conventional constructions, the bolt head moving transversely with the hotter piston head relatively to the threaded end in the sleeve.

The thread and the shaft of the bolt are practically only stressed by the pretension applied to the bolt. Considerably less bolts are needed for one piston than with conventional constructions, so that the weight of the piston is reduced. Even if a bolt is arranged in the axial center plane of the piston pin, the bolt is not dynamically stressed.

The sleeve preferably abuts against a hollow nut screwed into the skirt part of the piston above the sleeve, so that the sleeve is loose and can freely adjust its position and deformations of the sleeve cannot produce bending stresses in the thread connection between the bolt and the sleeve. The sleeve and the aforesaid nut may be locked against rotation by any suitable means, for example by means of protuberances or noses extending into the skirt part of the piston or into suitable intermediate parts. The sleeve is preferably provided with a spline to lock it against rotation.

Further and other objects of the present invention will be hereinafter set forth in the accompanying specification and claims, and shown in the drawing which, by way of illustration, shows what I now consider to be a preferred embodiment of my invention.

The one figure of the drawing forming part of the present application for Letters Patent illustrates a part longitudinal section of a screw bolt connection according to the invention for connecting the oil cooled head to the skirt part of a piston for an internal combustion engine.

In the drawing numeral 1 designates the skirt part of the piston comprising a bearing 2 for the piston pin. Numeral 3 designates a separate piston head which is provided with channels 4 and 5 for circulating cooling oil and with grooves 6 for receiving piston rings. Shims 7 are provided between the head part 3 and the skirt part 1, both parts being held together by means of a bolt 8. The head of the latter is in a recess 9 of the head part 3. Numeral 10 designates the shaft of the bolt whose tensionable length is shown by the measure 21. The lower end of the connecting bolt is provided with a thread 11 which is screwed into an internal thread at the lower end of a sleeve 12. The upper end of the latter is provided with splines 13 conforming with and extending into recesses in the skirt part 1. The top of the sleeve 12 has a conical or spherical surface 18 abutting against a similar surface at the bottom of an annular nut 14 which is screwed into the flange 15 closing the top of the skirt part 1. The nut 14 is secured in the flange 15 by means of a lock screw 16.

As is obvious from the drawing, the bolt 8, although it is positioned drectly above the bearing 2, is not affected by forces transmitted from the bearing to the piston skirt. Measure 21 shows the extraordinary tensionable length of the bolt to which the (negative) tensionable length shown by measure 22 of the sleeve 12 must be added.

While I believe the above described embodiments of my invention to be preferred embodiments, I wish it to be understood that I do not desire to be limited to the exact details of design and construction shown and described, for obvious modifications will occur to a person skilled in the art.

What is claimed is:

1. A screw bolt connection for multipartite pistons of internal combustion engines having a separate piston head and skirt part, said connection comprising a compressible sleeve extending into and being longitudinally movable in the skirt part, the end of the sleeve proximal of the piston head being held in a portion of the skirt part which is adjacent the piston head, and a tension bolt longitudinally movably extending from the piston head into said sleeve and having a free end connected with the end of said sleeve distal of the head part.

2. A screw bolt connection as defined in claim 1, in which the tensionable cross section of said bolt is at least as great as the cross section of said sleeve.

3. A screw bolt connection as defined in claim 1, in which the end of said sleeve proximal of the piston head is held in a flange portion which closes the top of the skirt part.

4. A screw bolt connection as defined in claim 1, comprising a hollow nut screwed into the skirt part of the piston and abutting against the end of said sleeve which end is proximal of the piston head.

5. A screw bolt connection as defined in claim 1, comprising an annular nut screwed into the skirt part of the piston and having a substantially conical end surface abutting against a corresponding surface at the end of said sleeve which end is proximal of the piston head.

6. A screw bolt connection as defined in claim 1, said sleeve being provided with splines extending into recesses in the skirt part of the piston for locking the sleeve against rotation.

7. A screw bolt connection as defined in claim 1, said sleeve being at least half as long as said bolt.

8. A screw bolt connection as defined in claim 1, in which said skirt part has a substantially cylindrical cavity for receiving said sleeve, the bottom of said cavity being closed.

References Cited in the file of this patent
UNITED STATES PATENTS

| | | |
|---|---|---|
| 1,982,488 | Weber | Nov. 27, 1934 |
| 2,159,402 | Retschy | May 23, 1939 |
| 2,234,762 | Harrah | Mar. 11, 1941 |
| 2,446,174 | Flynt | Aug. 3, 1948 |
| 2,701,398 | Bohmer | Feb. 8, 1955 |